US012671892B2

(12) United States Patent (10) Patent No.: US 12,671,892 B2
Liu et al. (45) Date of Patent: Jun. 30, 2026

(54) METHOD AND DISPLAY APPARATUS FOR IMAGE PROCESSING

(71) Applicant: HISENSE VISUAL TECHNOLOGY CO., LTD., Shandong (CN)

(72) Inventors: Zhaolei Liu, Shandong (CN); Luming Yang, Shandong (CN); Deli Tian, Shandong (CN); Junhou Jiang, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 373 days.

(21) Appl. No.: 18/433,798

(22) Filed: Feb. 6, 2024

(65) Prior Publication Data

US 2024/0179396 A1 May 30, 2024

Related U.S. Application Data

(63) Continuation of application No. PCT/CN2022/095610, filed on May 27, 2022.

(30) Foreign Application Priority Data

Aug. 6, 2021 (CN) .......................... 202110901318.7
Aug. 6, 2021 (CN) .......................... 202110902251.9

(51) Int. Cl.
*H04N 23/63* (2023.01)
*H04N 23/80* (2023.01)

(52) U.S. Cl.
CPC ............. *H04N 23/63* (2023.01); *H04N 23/80* (2023.01)

(58) Field of Classification Search
CPC ............................... H04N 23/63; H04N 23/80
See application file for complete search history.

(56) References Cited

U.S. PATENT DOCUMENTS

2020/0344435 A1* 10/2020 Choi ...................... G06F 3/1454
2022/0300241 A1* 9/2022 Song ...................... H04N 5/655

FOREIGN PATENT DOCUMENTS

| CN | 111225138 A | 6/2020 |
|----|-------------|--------|
| CN | 111246266 A | 6/2020 |
| CN | 111885265 A | 11/2020 |
| CN | 111970550 A | 11/2020 |
| CN | 212343919 U | 1/2021 |
| CN | 112752024 A | 5/2021 |
| CN | 114285985 A | 4/2022 |

(Continued)

OTHER PUBLICATIONS

International Search Report, mailed Jul. 28, 2022, from PCT/CN2022/095610, 5 pages.

(Continued)

*Primary Examiner* — Lin Ye
*Assistant Examiner* — Fayez A Bhuiyan
(74) *Attorney, Agent, or Firm* — Workman Nydegger

(57) ABSTRACT

Provided in the disclosure are a method and a display apparatus for image processing. The method can include: receiving a command for starting a preset application, and obtaining the sequence of ports plugged by cameras on the display apparatus and a screen mode, where the screen mode is configured to indicate that a display is in a landscape mode or a portrait mode; and capturing an image by a camera corresponding to a port in a preset order in the sequence according to the screen mode.

16 Claims, 11 Drawing Sheets

(56)     References Cited

FOREIGN PATENT DOCUMENTS

| | | | |
|---|---|---|---|
| CN | 114285986 | A | 4/2022 |
| JP | 2007088747 | A | 4/2007 |

OTHER PUBLICATIONS

Chinese First Office Action, mailed Jul. 26, 2022, from Chinese Patent App. No. 202110901318.7, 11 pages.
Chinese Second Office Action, mailed Jan. 19, 2023, from Chinese Patent App. No. 202110901318.7, 11 pages.
Chinese First Office Action, mailed Jul. 26, 2022, from Chinese Patent App. No. 202110902251.9, 13 pages.

* cited by examiner

71

Receiving a command for starting a preset application, and
obtaining a sequence of ports being connected with cameras
on the display apparatus and a screen mode

S100

Capturing an image by the camera corresponding to the port in
the preset order in the plugged sequence according to the
screen mode

S200

151

Magic props    Magic Show    Take a photo /long press to start recording    AR makeup test    Settings No camera detected, please check whether a camera is connected I know Receiving a command for starting a preset application, and obtaining port information, the screen mode, and the rotation state — S101

Determining the camera type according to the port information, the screen mode and the rotation state — S201

Controlling the camera to capture an image according to the camera type, the port information and the screen mode — S301

METHOD AND DISPLAY APPARATUS FOR IMAGE PROCESSING

CROSS REFERENCES TO RELATED APPLICATIONS

The application is a continuation of International Application No. PCT/CN2022/095610, filed on May 27, 2022, which claims priorities to Chinese Patent Application No. 202110901318.7 filed on Aug. 6, 2021 and Chinese Patent Application No. 202110902251.9 filed on Aug. 6, 2021, the entire contents of which are incorporated herein by reference.

TECHNICAL FIELD

The disclosure relates to the technical field of image processing, in particular to a method and a display apparatus for image processing.

BACKGROUND

In the related art, a display of a rotating television can be used in various usage scenarios due to its ability to rotate. For the convenience of users, the rotating television can include one or more ports for connecting with one or more external cameras. The one or more ports include a first port and a second port. The first port can locate at the top of the display when the display is in a landscape mode, and the second port can locate at the top of the display when the display is in a portrait mode, that is, at a left or right side of the display when the display is in the landscape mode. When two ports are connected with cameras at the same time, the images captured by the cameras are often presented on the display in a rotating mode, resulting in a poor user experience.

SUMMARY

Embodiments of the disclosure provide a display apparatus, including: a display, configured to display an image or a user interface; a user input interface, configured to receive input signals; and one or more processors, in connection with the display and the user input interface respectively. The one or more processors is configured to execute instructions to cause the display apparatus to perform: receiving a command for starting a preset application in the display apparatus, and obtaining a plugged sequence of ports plugged by cameras on the display apparatus and a screen mode of the display, wherein the screen mode is configured to indicate that the display is in a landscape mode or a portrait mode; starting a camera corresponding to a port in a preset order in the plugged sequence of ports; and based on the screen mode, controlling the camera to capture a first image according to a preview image ratio, rotating the first image by a preset angle, and displaying rotated first image on the display.

Embodiments of the disclosure provide an image processing method for a display apparatus, including: receiving a command for starting a preset application in the display apparatus, and obtaining a plugged sequence of ports plugged by cameras on the display apparatus and a screen mode of the display, wherein the screen mode is configured to indicate that the display is in a landscape mode or a portrait mode; starting a camera corresponding to a port in a preset order in the plugged sequence of ports; and based on the screen mode, controlling the camera to capture a first image according to a preview image ratio, rotating the first image by a preset angle, and displaying rotated first image on the display.

DETAILED DESCRIPTION

In order to enable the skilled in the art to better understand the disclosure, the embodiments of the disclosure will be described clearly and completely below with reference to the accompanying drawings in the embodiments of the disclosure. Obviously, the embodiments described are only some embodiments of the disclosure, but not all of the embodiments. Based on the embodiments in the disclosure, all other embodiments obtained by the skilled in the art without creative efforts should fall within the scope of protection of the disclosure.

The rotating television can be a new type of smart television, which mainly can include a display and a rotating component. The display can be fixed on a wall or a stand through the rotating component, and an orientation of the display can be adjusted through the rotating component to make the display rotatable, in order to adapt to different aspect ratios of display images. For example, in most cases, the display can be in a landscape mode to display video images with aspect ratios of 16:9, 18:9, and so on. When the aspect ratio of the video images is 9:16, 9:18, etc., the display in the landscape mode needs to scale the image and display black images on both left and right sides of the display. In this case, the display can be set in a portrait mode via the rotating component to adapt to video images with aspect ratios of 9:16, 9:18, etc.

In order to facilitate the presentation of a target media resource detail page in the landscape mode or the portrait mode of the display for the user, and to improve user viewing experience when the display apparatus is in different viewing modes, embodiments of the disclosure provide a display apparatus, a detail page display method, and a computer storage medium. The display apparatus, for example, can be a rotating television. It should be noted that the method provided in the embodiments are not only applicable to rotating televisions, but also applicable to other display apparatus, such as computers, tablet computers, etc.

The term "remote control" used in various embodiments of the disclosure refers to a component of an electronic apparatus (such as the display apparatus in the disclosure), which can wirelessly control the electronic apparatus within a short distance. The component can generally connect with the electronic apparatus via infrared and/or Radio Frequency (RF), signals and/or Bluetooth, and the component can also include functional modules such as WiFi, wireless USB, Bluetooth, and motion sensors. For example, for a handheld touch remote control, most of the physical built-in hard keys in general remote control devices can be replaced by a user interface in the touch screen.

Figure 1A:
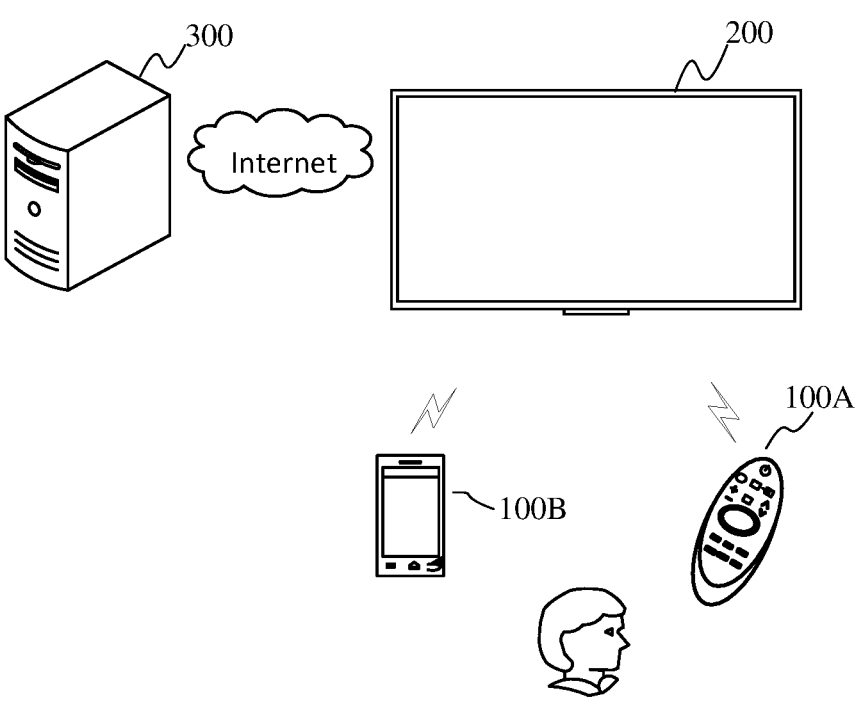
FIG. 1A shows a scenario of a display apparatus according to some embodiments of the disclosure.

Referring to FIG. 1A, a scenario of a display apparatus is provided according to some embodiments of the disclosure. As shown in FIG. 1A, the control device 100 and the display apparatus 200 can communicate in a wired or wireless manner.

The control device 100 can be configured to control the display apparatus 200, and can receive a command from the user and convert the command into an instruction that the display apparatus 200 can recognize and respond to, serving as an intermediary for interaction between the user and the display apparatus 200. For example, the user operates a CH+/− key on the control device 100, and the display apparatus 200 responds to the instruction from the CH+/− key.

The control device 100 may be a remote control 100A, and can communicate with the display apparatus 200 through at least one of infrared protocol communication or Bluetooth protocol communication and other short-range communication methods, and controls the display apparatus 200 wirelessly or by other wired methods. The user can control the display apparatus 200 by inputting a command through keys, voice input, and control panel input on the remote control.

The control device 100 may also be a smart device, such as a mobile terminal 100B, a tablet computer, a computer, a notebook computer, etc. For example, the display apparatus 200 can be controlled using an application running on the smart device. The application can be configured to provide users with various controls through an intuitive user interface (UI) on the screen associated with the smart device.

The mobile terminal 100B and the display apparatus 200 can install software applications, and communicate through a network communication protocol, to realize one-to-one control and data communication.

The display apparatus 200 may provide broadcast reception functions and Internet television functions. For example, the display apparatus may be a digital television, an Internet television, an Internet Protocol Television (IPTV), etc.

The display apparatus 200 may be a liquid crystal display, an organic light-emitting display, or a projection apparatus. The specific type, size and resolution of the display apparatus are not limited.

The display apparatus 200 can communicate data with the server 300 through various methods. The display apparatus 200 may perform the communication and connection through a Local Area Network (LAN), a Wireless Local Area Network (WLAN), and other networks. The server 300 can provide various content and interaction functions to the display apparatus 200. For example, the display apparatus 200 can transmit and receive information, for example, receiving Electronic Program Guide (EPG) data, receiving software program updates, or accessing a remotely stored digital media library.

Figure 1B:
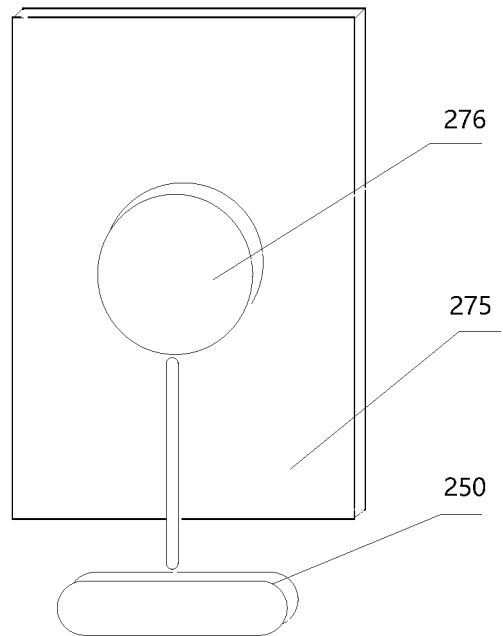
FIG. 1B shows a rear view of a display apparatus according to some embodiments of the disclosure.

In some embodiments, as shown in FIG. 1B, the display apparatus 200 can include a processor 250, a display 275 and a rotating component 276 connected with a backplane. The rotating component 276 can rotate the display. From a front view of the display apparatus, the rotating component 276 can rotate the display to be in a portrait mode, that is, a vertical side length of the screen can be greater than a horizontal side length. The rotating component 276 can also rotate the display apparatus to be in a landscape mode, that is, the horizontal side length of the screen can be greater than the vertical side length.

Figure 2:
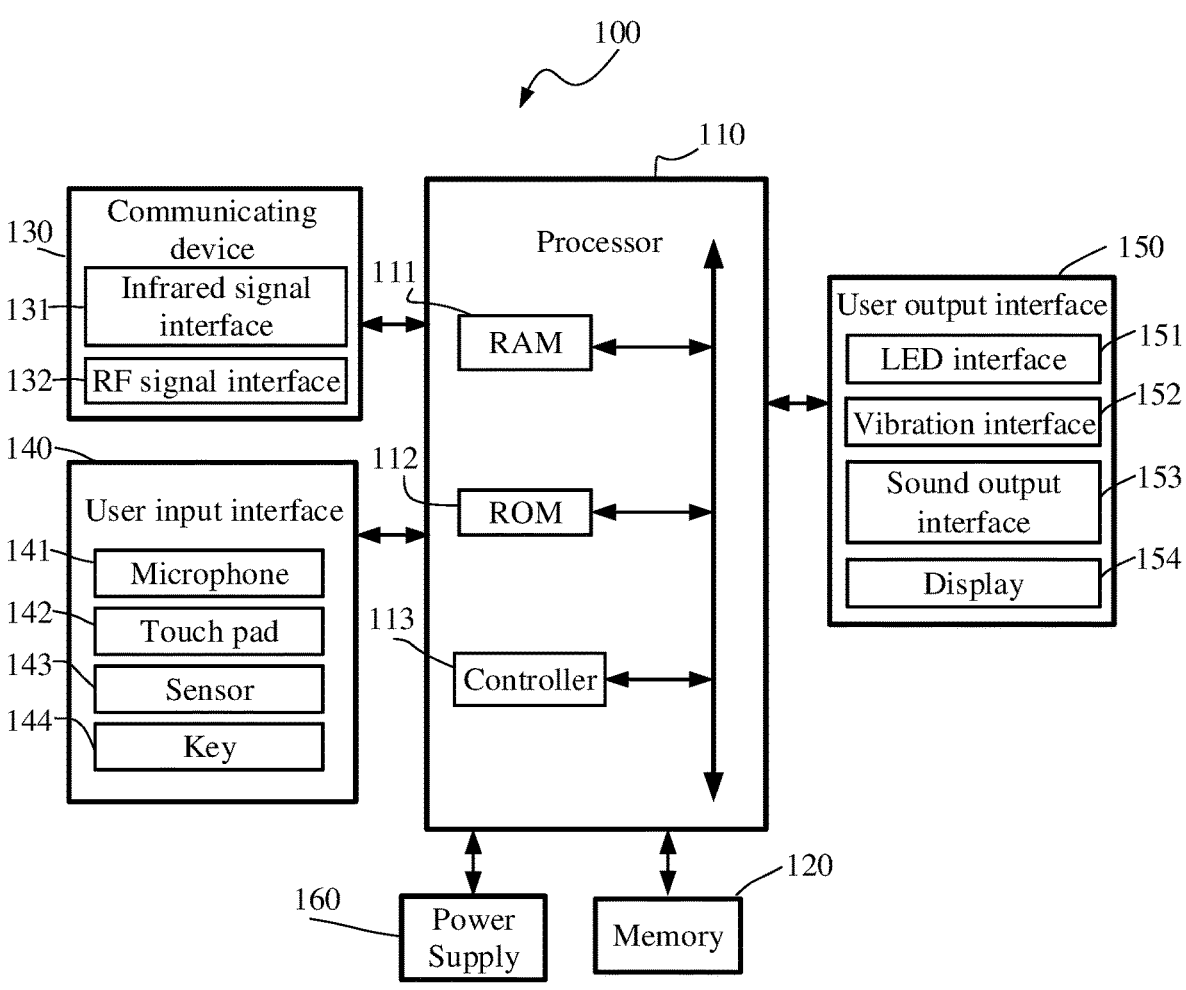
FIG. 2 shows a block diagram of hardware configuration of a control device 100 in FIG. 1 according to some embodiments of the disclosure.

FIG. 2 shows a block diagram of hardware configuration of a control device 100. As shown in FIG. 2, the control device 100 can include a processor 110, a memory 120, a communicating device 130, a user input interface 140, a user output interface 150, and a power supply 160.

Figure 3:
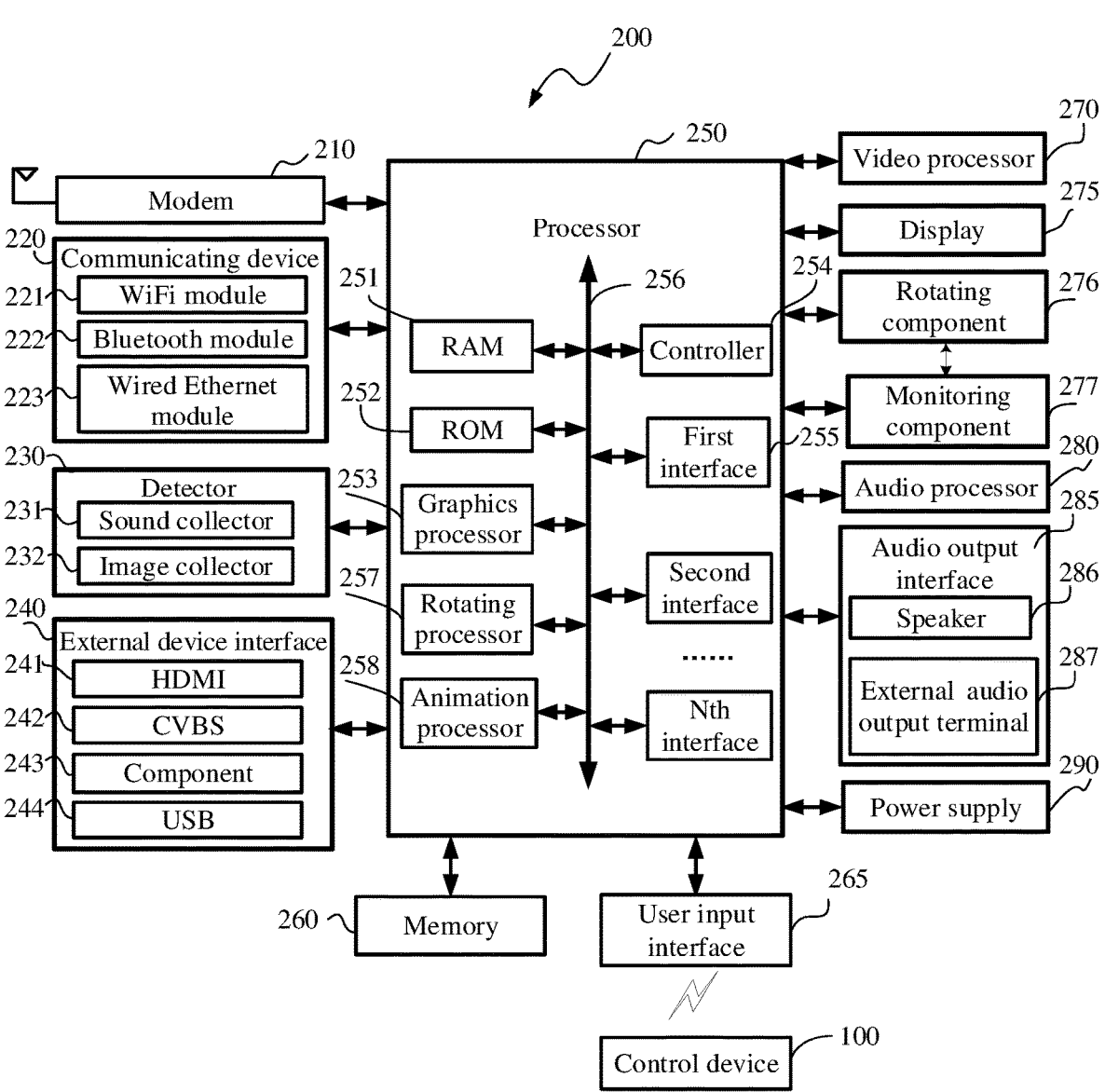
FIG. 3 shows a block diagram of hardware configuration of a display apparatus 200 in FIG. 1 according to some embodiments of the disclosure.

FIG. 3 shows a block diagram of hardware configuration of a display apparatus 200. As shown in FIG. 3, the display apparatus 200 may include a modem 210, a communicating device 220, a detector 230, an external device interface 240, a processor 250, a memory 260, a user interface 265, a video processor 270, a display 275, a rotating component 276, a monitoring component 277, an audio processor 280, an audio output interface 285, and a power supply 290.

In some embodiments, the monitoring component 277 can be set independently or can be set in the processor(s).

In some embodiments, the rotating component 276 may include components such as a driving motor and a rotating shaft. The driving motor can be connected with the processor 250, and the driving motor outputs a rotation angle under the control of the processor 250. One end of the rotating shaft can be connected with the power output shaft of the driving motor, and the other end can be connected with the display 275, so that the display 275 can be fixedly installed on the wall or the stand through the rotating component 276.

The rotating component 276 may also include other components, such as a transmission component, a detection component, etc. Here, the transmission component can adjust the rotation speed and torque output by the rotating component 276 through a specific transmission ratio. In some embodiments, the transmission component can adopt a gear transmission mode. The detection component can include sensors arranged on the rotating shaft, which can be angle sensors, attitude sensors, etc. These sensors can detect parameters such as the angle of rotation of the rotating component 276, and transmit the detected parameters to the processor 250, so that the processor 250 can determine or adjust the status of the display apparatus 200 based on the detected parameters. In some embodiments, the rotating component 276 may include, but not limited to, one or more of the above components.

The monitoring component 277 can be configured to monitor the component rotation information of the rotating component 276 and output the component rotation information to the processor.

The modem 210 can receive signals from broadcast systems in a wired or wireless method, performs modulation and demodulation processes such as amplification, mixing, and resonance, and demodulates audio and video signals, and additional information such as Electronic Program Guide (EPG) data signals, from a plurality of wireless or wired broadcast television signals.

In some embodiments, the modem 210 may be in an external device, such as an external set-top box or the like. In this case, the set-top box outputs the television signal after modulation and demodulation, and then transmits it into the display apparatus 200 through the external device interface 240.

The communicating device 220 can be a component for communicating with an external device or server according to various types of communication protocols. For example, the display apparatus 200 may transmit content data to an external device connected with the communicating device 220, or browse and download content data from an external device connected with the communicating device 220. The communicating device 220 may include a WIFI module 221, a Bluetooth module 222, a wired Ethernet communication protocol module 223 and other network communication protocol modules or a near field communication protocol module. The communicating device 220 can receive control signals from the control device 100 under the control of the processor 250, and the control signals can be WIFI signals, Bluetooth signals, RF signals, etc.

The detector 230 may include a sound collector 231, an image collector 232, a temperature sensor, etc.

The external device interface 240 can be a component that provides data transmission between display apparatus 200 controlled by the processor 250 and external device. The external device interface 240 can be connected with external device such as a set-top box, a game device, a laptop, etc. in a wired/wireless method, and can receive data from external device such as video signals (for example, motion images), audio signals (for example, music), and additional information (for example, EPG).

In some embodiments, the external device interface 240 may include any one or more: a High Definition Multimedia Interface (HDMI) port 241, a Composite Video Blanking Sync (CVBS) port 242, an analog or digital component port 243, and a Universal Serial Bus (USB) port 244, component port (not shown in the figures), Red Green Blue (RGB) port (not shown in the figures), etc.

The processor 250 controls the operation of the display apparatus 200 and responds to user' commands by running various software programs (such as operating systems and various applications) stored on the memory 260.

As shown in FIG. 3, the processor 250 can include one or more processors, such as a Random Access Memory (RAM) 251, a Read Only Memory (ROM) 252, a graphics processor 253, a controller 254, a first interface 255, a communication bus 256, a rotating processor 257 and an animation processor 258. The first interface 255 can be a communication interface. Here, the RAM 251, the ROM 252, the graphics processor 253, the processor 254, the first interface 255, the rotating processor 257 and the animation processor 258 are connected through a communication bus 256. The functions of the rotating processor 257 and the animation processor 258 will be described in detail in following embodiments.

The processor(s) can control the all operations of the display apparatus 200. For example, in response to a selection of a Graphical User Interface (GUI) object presented on the display 275, the processor(s) may perform operations related to the selected GUI object.

The memory 260 can be configured to store various types of data, software programs or applications that drive and control the operation of the display apparatus 200. The memory 260 may include volatile and/or non-volatile memory. The term "memory" can include the memory 260, the RAM 251 and ROM 252 in the processor(s), or the memory card in the display apparatus 200.

In some embodiments, the memory 260 can be configured to store running programs that drive the processor(s) in the display apparatus 200, to store various applications built in the display apparatus 200 and downloaded by users from external devices, and to store data of visual effect images for configuring various GUIs, GUI-related objects, and selectors for selecting GUI object provided on the display 275.

In some embodiments, the memory 260 can be specifically configured to store driving applications and related data of the modem 210, the communicating device 220, the detector 230, the external device interface 240, the video processor 270, the display 275, the audio processor 280, etc., such as external data (for example, audio and video data) received from an external device interface or user data (such as key information, voice information, touch information, etc.) received via a user interface.

Figure 4:
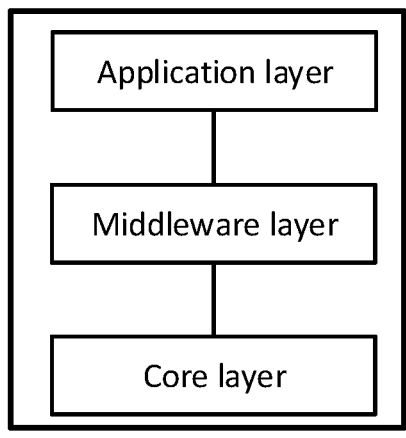
FIG. 4 shows a block diagram of architectural configuration of an operating system in a memory of the display apparatus 200 according to some embodiments of the disclosure.

FIG. 4 shows a block diagram of architectural configuration of an operating system in a memory of the display apparatus 200. The operating system architecture can include an application layer, a middleware layer and a kernel layer from top to bottom.

Referring to FIG. 3, the user input interface 265 receives various user inputs. In some embodiments, the user input interface 265 can be configured to transmit the user's input signal to the processor(s), or to provide the output signal from the processor(s) to the user. For example, the remote control 100A can transmit user input signals such as power up/down signals, channel selection signals, volume adjustment signals, etc. to the user input interface 265; and then the user input interface 265 transmits them to the processor(s).

In some embodiments, the user may input a command on a graphical user interface displayed on the display 275, and the user input interface 265 can receive the command through the GUI. In some embodiments, the user input interface 265 may receive a command for controlling a position of a selector on the GUI to select different objects or items.

The video processor 270 can be configured to receive external video signals and perform video data processing according to the standard codec protocol of the input signal, such as decompression, decoding, scaling, noise reduction, frame rate conversion, resolution conversion, and image synthesis, to obtain the video signal to be displayed or played directly on the display 275.

The display 275 can be configured to receive image signals from the video processor 270 and display video content, images and menu control interfaces. The displayed video content may be the video content in the broadcast signal received by the modem 210, or may be the video content input via the communicating device 220 or the external device interface 240. The display 275 further displays the user interface (UI) generated in the display apparatus 200 and configured to control the display apparatus 200.

The display 275 may include a panel component for image display and a driving component for driving image display. Alternatively, the display 275 may be a projection display 275, which may also include a projection device and a projection screen.

The rotating component 276 can be configured to rotate the display 275 under the control of a control signal from the processor.

The monitoring component 277 can be configured to monitor the component rotation information of the rotating component 276 and output the component rotation information to the processor.

The audio processor 280 can be configured to receive external audio signals, perform audio data processing according to the standard codec protocol of the input signal, such as decompression, decoding noise reduction, digital-to-analog conversion, and amplification processing, so as to obtain audio signal that can be played via the speaker 286.

The audio processor 280 may support various audio formats. For example, MPEG-2, MPEG-4, Advanced Audio Coding (AAC), High Efficient AAC (HE-AAC) and other formats.

The audio output interface 285 can be configured to receive the audio signal output from the audio processor 280 under the control of the processor 250. The audio output interface 285 may include a speaker 286, or an external audio output terminal 287 output to a sounding device of an external device, such as a headset output terminal.

The power supply 290 can be configured to provide power supply support for the display apparatus 200 with power from an external power source under the control of the processor. The power supply 290 may be a built-in power circuit inside the display apparatus 200, or may be a power supply installed outside the display apparatus 200.

In the related art, a display of a rotating television can be used in various usage scenarios due to its ability to rotate. For the convenience of users, the rotating television can include ports for connecting with external cameras. The ports include a first port and a second port. The first port can be located at the top of the display when the display is in the landscape mode, and the second port can be located at the top of the display when the display is in the portrait mode, that is, at a left or right side of the display when the display is in the landscape mode. When two ports are connected with cameras at the same time, the image captured by the cameras may be often presented on the display in a rotating mode, resulting in a poor user experience.

Figure 5:
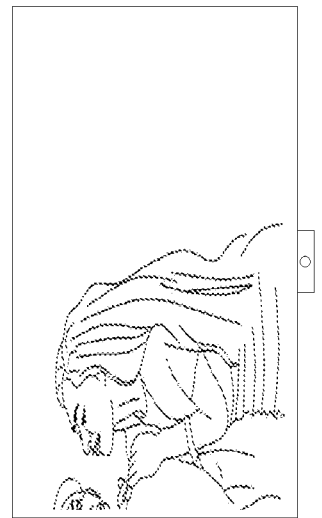
FIGS. 5 and 6 show schematic diagrams of an image captured by a camera in the related art.
Figure 6:
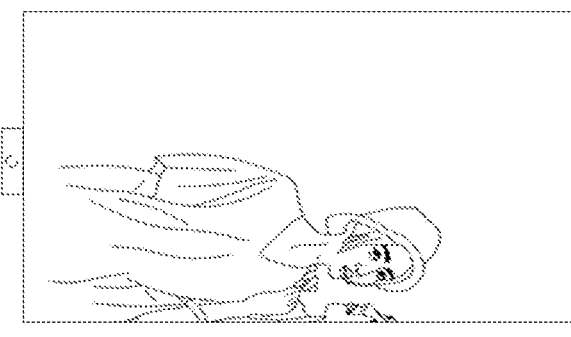

When the camera at the first port is used for capturing an image and the screen is in the portrait mode, the image will be rotated on the display, as shown in FIG. 5. When the camera of the second port is used for capturing an image, and the screen is in the landscape mode, the image will be rotated on the display, as shown in FIG. 6. It should be noted that the image rotation direction of the abnormal cases shown in FIG. 5 and FIG. 6 is only an example. In some embodiments, there can be other rotation directions in an abnormal case. For example, as shown in FIG. 5, a direction which the portrait's head locates (for example, the horizontal direction) in FIG. 5 is opposite to a direction from camera's orientation with respect to the display apparatus (for example, the vertical direction). In some embodiments, the direction of the portrait's head is same as the direction of the camera with respect to the display apparatus.

Therefore, how to select a camera and how to ensure that the image captured by the camera is displayed on the display without rotation is a problem for those skilled in the art.

Figures 7, 8:
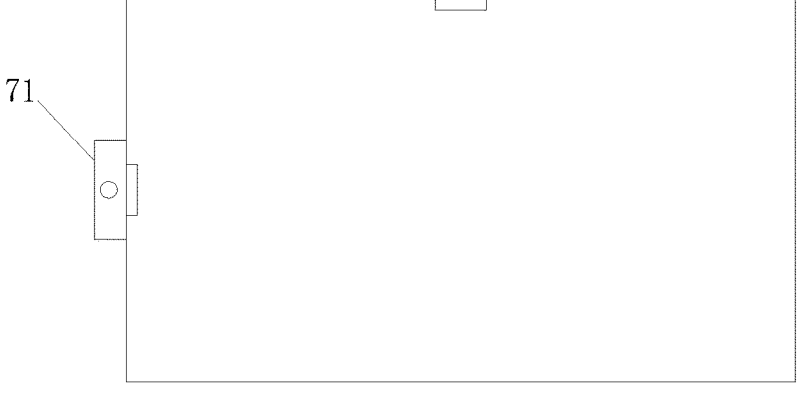
FIG. 7 shows a schematic diagram of a direct plug-in camera.
FIG. 8 shows a flowchart of a method for capturing an image by a camera.

The embodiments of the disclosure take the direct plug-in camera as an example, as shown in FIG. 7. The direct plug-in camera 71 can be a camera that can move following the rotation of the display.

In view of the above issues, embodiments of the disclosure provide a method for capturing an image by a camera. Based on the method, the images captured by multiple cameras can be presented on the display normally when the multiple cameras are connected the display apparatus. In some embodiments, the multiple cameras include a built-in camera. In this case, the images displayed on the display are not rotated.

As shown in FIG. 8, the method can include the following operations.

S100: receiving a command for starting a preset application, and obtaining a sequence of ports being connected with cameras on the display apparatus and a screen mode, where the screen mode is configured to indicate that a screen is in a landscape mode or a portrait mode.

Figure 9:
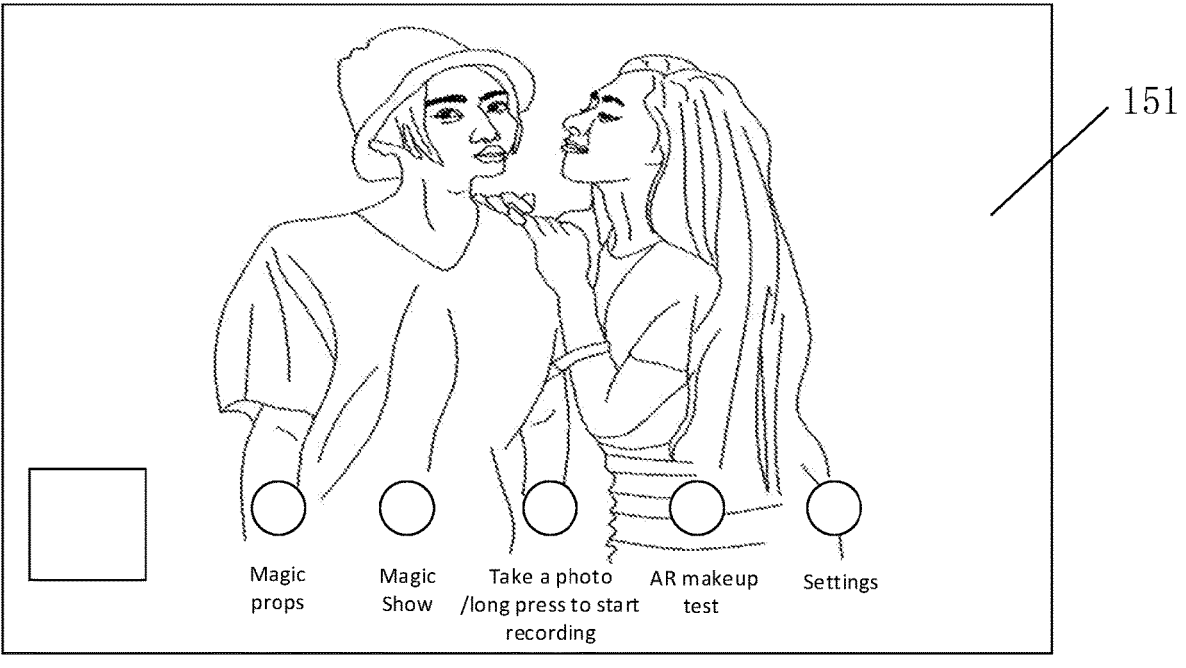
FIGS. 9 to 11 show schematic diagrams of a user interface.

In some embodiments, the preset application may be an application involving photo-taking. The focus on the display apparatus can be moved to the control of the preset application through a control device, and the confirmation key on the control device can be pressed to generate a command for starting the preset application. After starting the preset application, the user interface can be displayed as shown in FIG. 9, and the image captured by the camera can be displayed in the preview box of the user interface. In some embodiments, the user can move the focus to a photo-taking control through the control device to achieve the purpose of capturing an image.

In some embodiments, the operation for determining the sequence of the ports plugged by cameras on the display apparatus, can include: starting a preset service in the display apparatus; determining whether a camera is plugged into the display apparatus according to the preset service; and monitoring port plugged information, where the port plugged information can include information of the port being plugged by the camera and information of the camera being unplugged from the port. In some embodiments of the disclosure, the preset service may be a background service (GlobalUI).

In some embodiments, when it is detected that the camera is plugged into or connected with the display apparatus, a first preset file is generated. The determining whether a camera is plugged into or connected with the display apparatus can include: determining whether there is a first preset file; if the first preset file exists, then it is determined that a camera is plugged into the display apparatus; and if there is no first preset file, then it is determined that no camera is plugged into the display apparatus. In some embodiments of the disclosure, when the camera is plugged into the display apparatus, the first preset file is automatically generated. When determining whether a camera is plugged into the display apparatus, whether the first preset file exists will be determined. If the first preset file exists, it is determined that a camera is plugged into the display apparatus. If the first preset file does not exist, it is determined that no camera is plugged into the display apparatus. The disclosure may also use other methods to determine whether a camera is plugged into the display apparatus, which will not be limited in the disclosure.

Figure 10:
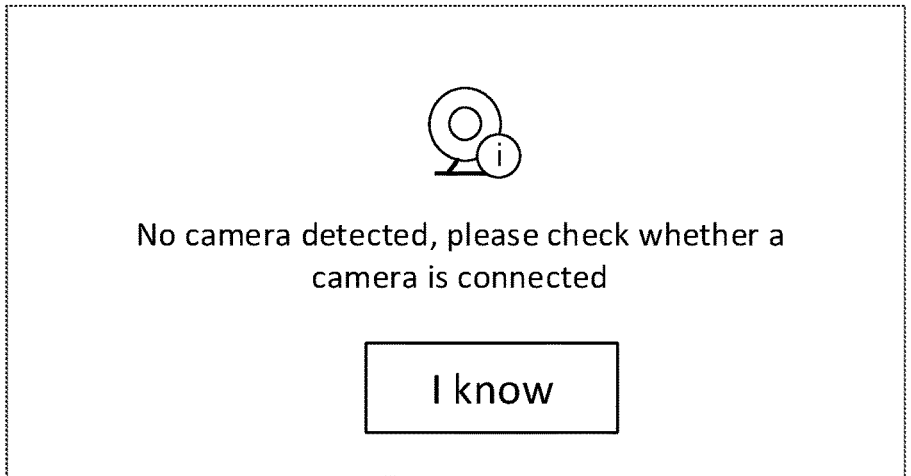

If no camera is plugged into the display apparatus, the display can be controlled to display prompt information for plugging a camera. The form of the prompt information may not be limited and can be a picture, text or sound etc. For example, as shown in FIG. 10, the prompt information can be that no camera detected, please check whether a camera is connected.

Figure 11:
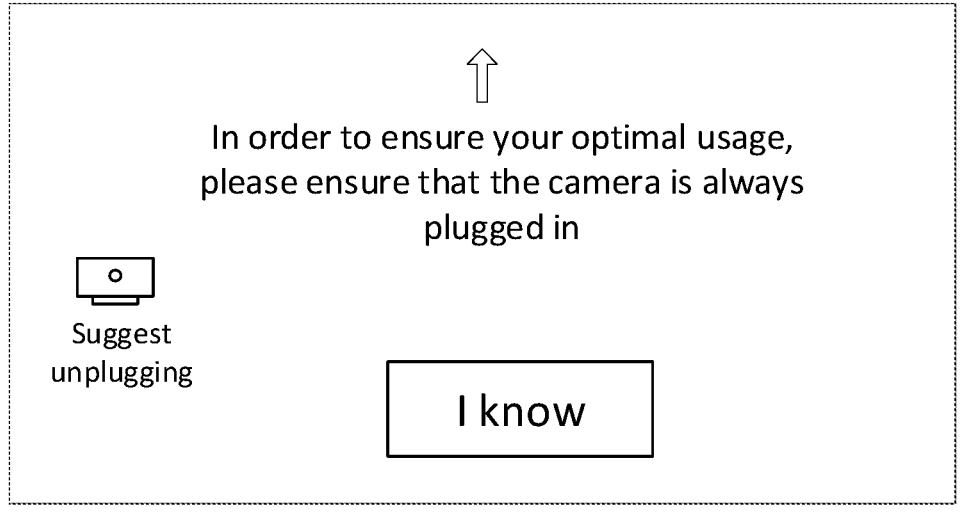

In some embodiments, if cameras are plugged into the display apparatus and both the first port and the second port are plugged by the cameras, the display can be controlled to display prompt information for unplugging a camera. The form of the prompt information for unplugging the camera is not limited. For example, as shown in FIG. 11, the prompt information can be that in order to ensure your optimal usage, please ensure that the camera is always plugged in the display apparatus.

In some embodiments, in a case where one or more cameras are plugged into the display apparatus, the sequence of the ports plugged by cameras on the display apparatus can be determined; and the sequence of the ports plugged by cameras on the display apparatus can be updated, in a case of monitoring the port being plugged by a camera, or the port being unplugged by the camera. When it is monitored that the camera is pulled out of the port or that the port is plugged by a camera, a camera corresponding to a port in the preset order in the updated sequence can be used to capture an image according to the screen mode.

When a camera is plugged into the display apparatus, the information of port in the display apparatus plugged by the camera can be first determined. The information of port can include a first port and/or a second port, and a plugged sequence corresponding to each port can be determined at the same time. After it is recognized that the camera is plugged into the first port, the plugged sequence of the port is determined. After it is recognized that the camera is plugged into the second port, the plugged sequence of the port is determined.

In some embodiments, when it is detected that the camera is plugged into the display apparatus, a second preset file can be generated. The determining the information of ports in the display apparatus plugged by the camera can include: determining whether there is a second preset file; and if the second preset file exists, determining the port information according to a file name of the second preset file. In some embodiments of the disclosure, when the camera is plugged into the display apparatus, the second preset file can be automatically generated according to information of the plugged port. The file name of the second preset file can be generated according to information of the port being plugged. When the camera(s) are plugged into different ports, the file names of the second preset files are different. When the port information indicates the first port, the file name of the second preset file can be the first file name; and when the port information indicates the second port, the file name of the second preset file can be the second file name. The step for determining the port information according to the file name of the second preset file can include: determining whether there is a second preset file with the first file name; if it exists, it is determined that the port information is information of the first port; and if it does not exist, it is determined that the port information is information of the second port.

In some embodiments, the second preset file can include a first identifier. When a camera is plugged into a display apparatus, the camera is configured with the first identifier according to the plugged sequence. For example, when a first camera is plugged into the display apparatus, the first camera is configured with a first identifier (videox), for example, the value of the first identifier is 0; and when the second camera is plugged into the display apparatus, the second camera can be configured with a first identifier, for example, the value of the first identifier is 1. When the first camera is pulled out from the display apparatus and the third camera is plugged into the display apparatus, the third camera can be configured with a first identifier, for example, the value of the first identifier is 2.

The port(s) on the display apparatus can be configured with a second identifier. The second identifier (logicalID) can be determined based on the first identifier (videox) of the camera plugged into the port. The second identifier can include a third identifier LandscapeID and a fourth identifier PortraitID. The third identifier can be an identifier of the first port, and the fourth identifier can be an identifier of the second port. For example, the port plugged by the camera with the first identifier (for example, with a value being 0) can be the first port, and in this case, the third identifier LandscapeID can be configured as the value 0. The port plugged by the camera with the first identifier (for example, with a value being 1) can be the second port, and in this case, the fourth identifier PortraitID can be configured as a value 1. When the camera is plugged into the port of the display apparatus, the sequence in which the port(s) is or are plugged by the camera can be determined, and can be indicated by a fifth identifier. The fifth identifier can include a sixth identifier LandscapeInsertID and a seventh identifier PortraitInsertID. The sixth identifier can be the identifier for indicating the plugged sequence of the first port, and the seventh identifier can be the identifier for indicating the plugged sequence of the second port. For example, the port firstly plugged by a camera is the first port, and the corresponding sixth identifier can be 0; and then another port plugged by a camera is the second port, and the corresponding seventh identifier can be 1. When the camera in the port with the sixth identifier as 0 is pulled out, the seventh identifier corresponding to the port with the original seventh identifier as 1 is changed from 1 to 0, and the sixth identifier is changed from 0 to the default value of −1. It should be noted that the fifth identifier can be a non-negative number, and the smaller the value, the earlier the corresponding port is plugged.

For the following scenario, the sixth identifier and the seventh identifier are determined, and the sequence in which the ports are plugged by the cameras can be finally determined. In some embodiments, the port of the preset order can be the port that is ranked first in the sequence.

Scenario 1: when the display apparatus is powered on and no camera is plugged into a port of the display apparatus, a camera is then plugged. If the camera is plugged into the first port, the first identifier can be X, the corresponding third identifier can be X, and the sixth identifier for indicating the plugged sequence can be 0. The second port is not plugged; and in this case, the first identifier can be set to the default value of −1, the fourth identifier can be −1, and the seventh identifier for indicating the plugged sequence can be −1. Since the sixth identifier can be a non-negative number, the first port serves as the port that ranks first in the plugged sequence.

Scenario 2: when the display apparatus is powered on and one camera has been plugged into a port of the display apparatus, another camera is then plugged into a port of the display apparatus. If the camera has been plugged into the first port when the display apparatus is powered on, the port plugged by said another camera can be the second port. In this case, the first identifier of the first port can be X, the corresponding third identifier can be X, and the sixth identifier for indicating the plugged sequence can be 0; and the first identifier of the second port can be X+1, the corresponding fourth identifier can be X+1, and the seventh identifier for indicating the plugged sequence can be 1. Since both the sixth identifier and the seventh identifier are non-negative numbers, and the sixth identifier can be smaller than the seventh identifier, the first port is determined as the port that ranks first in the plugged sequence.

Scenario 3: when the display apparatus is powered on and one camera has been plugged into a port of the display apparatus, the camera is then removed. In this case, the third identifier, the fourth identifier, the sixth identifier, and the seventh identifier are all the default value of −1. There is no port that ranks first in the plugged sequence.

Scenario 4: when the display apparatus is powered on and two cameras have been plugged into two ports of the display apparatus, one camera is then removed. If the camera plugged in the first port is removed, the third identifier can be the preset value of –1, the sixth identifier can be the preset value of –1; and in this case, the fourth identifier can be X, the seventh identifier can be 0, and the second port is determined as the port that ranks first in the plugged sequence finally.

In some embodiments of the disclosure, the sequence in which ports are plugged by cameras is monitored in real time, and the camera corresponding to the port which ranks first in the plugged sequence is used to capture an image.

S200: capturing an image by the camera corresponding to the port in the preset order in the plugged sequence according to the screen mode. The cameras in the embodiments of the disclosure support a first preview image ratio of m:n and a second preview image ratio of n:m.

In some embodiments, capturing an image by the camera corresponding to the port in the preset order in the plugged sequence according to the screen mode, can include one or more of the following operations.

If the port in the preset order in the plugged sequence is the first port, and the screen mode is the landscape mode, the display apparatus can be configured to: control the camera to capture an image according to the first preview image ratio of m:n; receive a rotation command for rotating the display, change the screen mode of the display apparatus, and rotate the display to a portrait mode; rotate an image captured by the camera by a preset angle; and display the rotated image on the display. For example, the first preview image ratio can be m:n, m can be 16, and n can be 9.

If the port in the preset order in the plugged sequence is the first port, and the screen mode is the portrait mode, the display apparatus can be configured to: rotate an image captured by the camera according to the first preview image ratio of m:n by an preset angle and display the rotated image on the display; receive a rotation command for rotating the display, change the screen mode of the display apparatus, and rotate the display to a landscape mode; and display an image captured by the camera according to the first preview image ratio of m:n on the display.

If the port in the preset order in the plugged sequence is the second port, and the screen mode is the landscape mode, the display apparatus can be configured to: rotate an image captured by the camera according to a second preview image ratio of n:m by a preset angle and display the rotated image on the display; receive a rotation command for rotating the display, change the screen mode of the display apparatus, and rotate the display to the portrait mode; and display an image captured by the camera according to the second preview image ratio of n:m on the display. For example, the second preview image ratio can be n:m, n can be 9, and m can be 16.

If the port in the preset order in the plugged sequence is the second port, and the screen mode is the portrait mode, the display apparatus can be configured to: control the camera to capture an image according to a second preview image ratio of n:m; receive a rotation command for rotating the display, change the screen mode of the display apparatus, and rotate the display to the landscape mode; rotate an image captured by the camera according to the second preview image ratio of n:m by a preset angle; and display the rotated image on the display.

In the above embodiments, a method and display apparatus for capturing an image by a camera is provided. The embodiments of the disclosure uses the camera corresponding to the port in the preset order to adjust an image captured by the camera in combination with the screen mode, so that the image can be normally displayed on the display to improve user experience. The method can include: receiving a command for starting a preset application, and obtaining a sequence of port(s) plugged by camera(s) on the display apparatus and a screen mode, where the screen mode is configured to indicate that a screen is in a landscape mode or a portrait mode; and capturing an image by a camera corresponding to a port in the preset order in the plugged sequence according to the screen mode.

Figure 12:
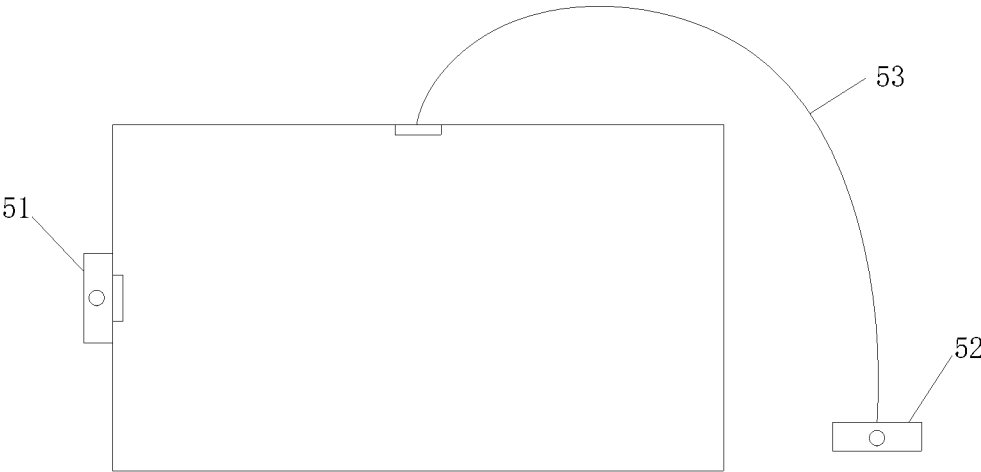
FIG. 12 shows a schematic diagram of different types of cameras according to some embodiments.

In some embodiments, the display apparatus can support plugging different types of cameras through ports. The types of cameras include a direct plug-in type or a sit-stand type. As shown in FIG. 12, the direct plug-in camera 51 can refer to the camera that will rotate following the display; and the sit-stand camera 52 can be connected with the port through the transmission line 53, and the sit-stand camera does not rotate when the display rotates.

Figure 13:
FIGS. 13 to 20 show schematic diagrams of an image captured by a camera in the related art.
Figure 14:

FIGS. 13 to 20 show images captured by cameras in different scenarios. The images in FIGS. 13 to 20 are captured when the position of the captured object remains unchanged. FIG. 13 shows an image captured by a camera when the screen is in the landscape mode, the camera is plugged into the first port, and the camera type is the direct plug-in type; and it can be seen that the image is displayed normally. FIG. 14 shows an image captured by a camera when the screen is in the landscape mode, the camera is plugged into the first port, and the camera type is the sit-stand type; and it can be seen that the image is displayed normally and is not rotated. In some embodiments of the disclosure, the position of the sit-stand camera can be set arbitrarily. For example, when capturing an image in FIG. 14, the position of the sit-stand camera is the same as that of the direct plug-in camera in FIG. 13. FIG. 14 only shows that there is a sit-stand camera, but does not indicate the position of the sit-stand camera when the image in FIG. 14 is captured.

Figure 15:

FIG. 15 shows an image captured by a camera when the screen is in the landscape mode, the camera is plugged into the second port, and the camera type is a direct plug-in type; and it can be seen that the image cannot be displayed normally and is rotated.

In some embodiments of the disclosure, the cameras are located at the first port and the second port, and the positions of the cameras relative to the person are different, so capturing ranges of the camera at the first port and the camera at the second port are also different. For example, the figures in FIG. 14 do not exceed the boundaries of the display interface on the display; and the figures in FIG. 15 exceed the boundary of the display interface on the display, and in this case, the user can adjust the position of the figures to ensure that all the figures are within the display interface.

Figure 16:
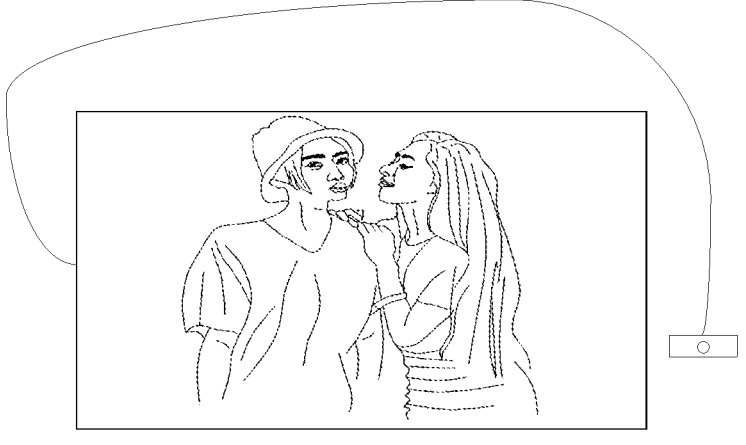
Figure 17:
Figure 18:
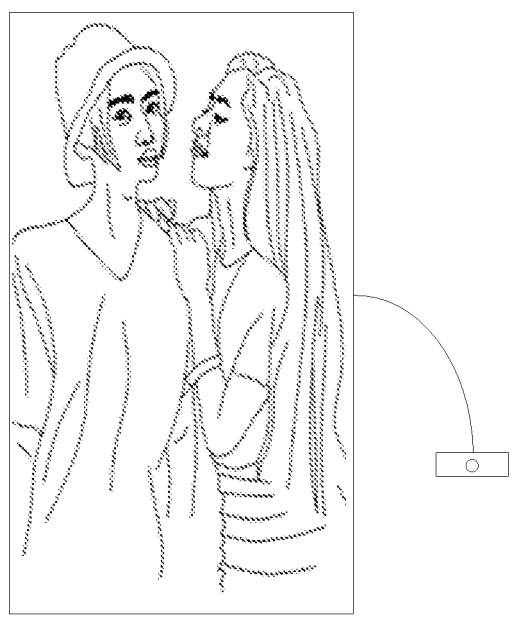
Figure 19:
Figure 20:
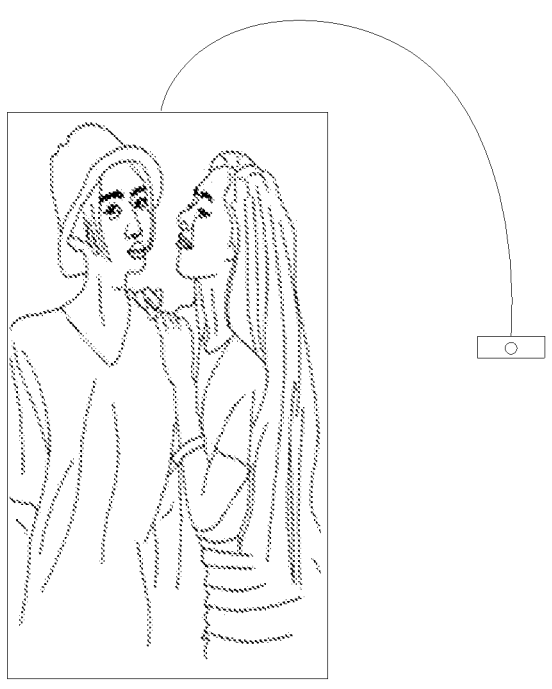

FIG. 16 shows an image captured by a camera when the screen is in the landscape mode, the camera is plugged into the second port, and the camera type can be a sit-stand type; and it can be seen that the image is displayed normally and is not rotated. FIG. 17 shows an image captured by a camera when the screen is in the portrait mode, the camera is plugged into the first port, and the camera type can be a direct plug-in type; and it can be seen that the image cannot be displayed normally and is rotated. FIG. 18 shows an image captured by the camera when the screen is in the portrait mode, the camera is plugged into the first port, and the camera type can be a sit-stand type; and it can be seen that the image can be displayed normally and is not rotated. FIG. 19 shows an image captured by the camera when the screen is in the portrait mode, the camera is plugged into the second port, and the camera type is a direct plug-in type; and it can be seen that the image can be displayed normally and is not rotated. FIG. 20 shows an image captured by the camera when the screen is in the portrait mode, the camera is plugged into the second port, and the camera type is a sit-stand type; and it can be seen that the image can be displayed normally and is not rotated.

It can be seen that the image cannot be displayed normally in two cases when the screen is in the landscape mode, the camera is plugged into the second port, and the camera type is a direct plug-in type, and when the screen is in the portrait mode, the camera is plugged into the first port, and the camera type is a direct plug-in type. It should be noted that the image rotation direction of the abnormal cases shown in FIG. 15 and FIG. 17 are only an example. In some embodiments, there can be other rotation directions in an abnormal case. For example, a direction of the portrait in FIG. 15 (for example, vertical direction) is opposite to a direction of the camera with respect to the display apparatus (for example, the horizontal direction). In some embodiments, the direction of the portrait in the captured image can be same as the direction of the camera.

In view of the above issue, after receiving a command for starting the preset application, the embodiments of the disclosure can also obtain the port information and rotation state in addition to the screen mode. The port information can be used to indicate the port plugged by the camera, the screen mode can be used to indicate that the screen is the landscape mode or the portrait mode, and the rotation state can be used to indicate whether the image is rotated. Based on the port information, the screen mode and the rotation state, the camera type can be determined; and based on the camera type, the port information and the screen mode, the camera can be controlled to capture an image so that the captured image can be displayed properly on the display.

In some embodiments, a method for determining the preview direction of the camera is provided. In the method, when the screen is in the landscape mode, the camera is plugged into the second port, and the camera type is a direct plug-in type, and when the screen is in the portrait mode, the camera is plugged into the first port, and the camera type is a direct plug-in type, the image captured by the camera can be displayed normally on the display. It should be noted that the embodiment is for plugging one camera into the display apparatus, not for the case of plugging two cameras. When there are two cameras, the user is prompted to pull out one of the cameras, or select one of the cameras to capture an image according to the preset method.

Figure 21:
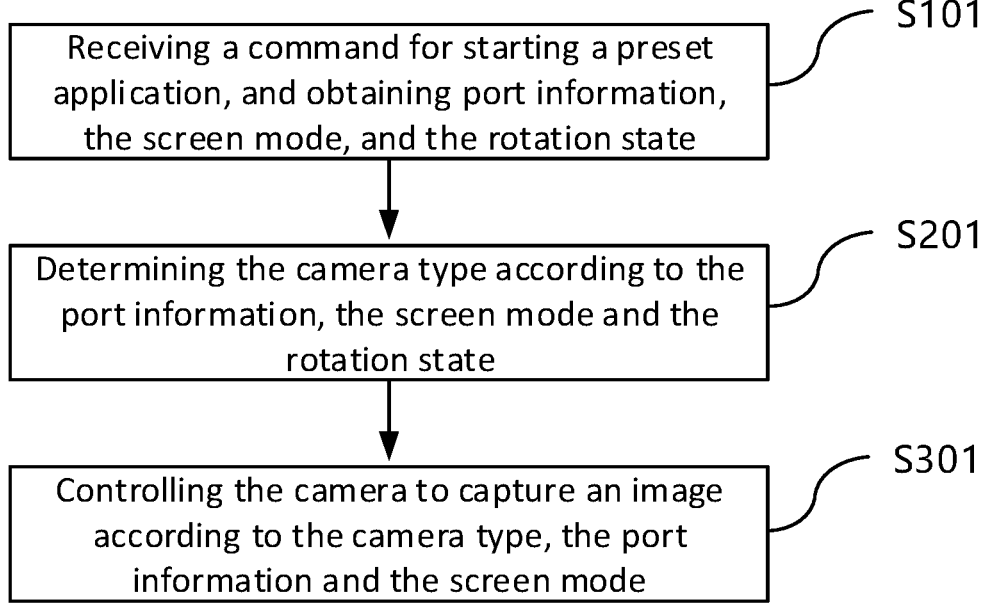
FIG. 21 shows a flowchart of a method for determining a preview direction of a camera.

In some embodiments, as shown in FIG. 21, the method for determining the preview direction of the camera can include: S101, receiving a command for starting a preset application, and obtaining port information, the screen mode, and the rotation mode.

In some embodiments, the command can be used for starting a preset application in the display apparatus. The preset application may be an application involving photo-taking. The focus on the display apparatus can be moved to the control or icon of the preset application through the control device, and the confirmation key on the control device can be pressed to generate a command for starting the preset application. After starting the preset application, the user interface is displayed as shown in FIG. 9, and an image captured by the camera can be displayed in the preview box on the user interface. In some embodiments, the user can move the focus to the photo-taking control through the control device to capture an image.

If a camera is plugged into the display apparatus, the information of ports in the display apparatus plugged by the camera is determined, where the information of ports can include a first port or a second port. When a camera is plugged into the display apparatus, the specific port in the display apparatus plugged by the camera can be determined.

If no camera is plugged into the display apparatus, the display can be controlled to display prompt information for plugging the camera. The form of the prompt information is not limited and can be a picture, text or sound etc. For example, as shown in FIG. 10, the prompt information is that no camera detected, please check whether a camera is connected.

In some embodiments, when it is detected that a camera is plugged into the display apparatus, the first preset file is generated. The step for determining whether a camera is plugged into the display apparatus can include: determining whether there is a first preset file; if the first preset file exists, then it is determined that a camera is plugged into the display apparatus; and if there is no first preset file, then it is determined that no camera is plugged into the display apparatus. In some embodiments of the disclosure, when the camera is plugged into the display apparatus, the first preset file can be automatically generated. When performing the step of determining whether a camera is plugged into the display apparatus, whether the first preset file exists will be determined. If the first preset file exists, it can be determined that a camera is plugged into the display apparatus. If the first preset file does not exist, it can be determined that no camera is plugged into the display apparatus. The disclosure may also use other methods to determine whether a camera is plugged into the display apparatus, which is not limited in the disclosure.

In some embodiments, the port information, the screen mode and the rotation state are obtained, where the port information can be used to indicate the port plugged by the camera, the screen mode can be used to indicate that the screen is in a landscape mode or a portrait mode, and the rotation state can be used to indicate whether the image is rotated. In some embodiments, when it is detected that the camera is plugged into the display apparatus, a second preset file can be generated. The step for determining the information of ports in the display apparatus plugged by the camera can include: determining whether there is a second preset file; and if the second preset file exists, determining the port information according to a file name of the second preset file. In some embodiments of the disclosure, when the camera is plugged into the display apparatus, the second preset file can be automatically generated according to the plugged port. The file name of the second preset file can be generated according to the port. When the camera is plugged into different ports, the file names of the second preset files are different. When the port information indicates the first port, the file name of the second preset file can be the first file name; and when the port information indicates the second port, the file name of the second preset file can be the second file name. The step for determining the port information according to the file name of the second preset file can include: determining whether there is a second preset file with the first file name; if it exists, it is determined that the port information indicates the first port; and if it does not exist, it is determined that the port information indicates the second port.

In some embodiments, the step for determining the rotation state can include: obtaining an image captured by a camera; and determining the rotation state of the image according to the image, where the rotation state can include rotation or non-rotation. In some embodiments, the step for determining the rotation state of the image according to the image can include: extracting a feature of the image, inputting the feature into a preset classifier, and determining the rotation state of the image.

In some embodiments of the disclosure, the preset classifier can be trained through sample data. In some embodiments, the feature of the image can be a texture feature, and the texture feature refers to contour of the object. The sample data can include texture features and rotation states of the object when rotation occurs, and the preset classifier can be trained through the sample data. It should be noted that in some embodiments of the disclosure, the rotation refers to 90° rotation.

In some embodiments, the texture feature of the image can be extracted, and the texture feature can be input into a preset classifier to obtain the rotation state of the image.

In some embodiments, there are multiple preset classifiers. For example, the preset classifiers include a first preset classifier and a second preset classifier. First, the feature of the image can be extracted and input into the first preset classifier, and the rotation state of the image can be obtained. In order to avoid the case that the rotation state of the image determined by the first preset classifier is inaccurate, when it is determined that the rotation state of the image determined by the first preset classifier is that the image is rotated, the feature(s) of the image corresponding to the second preset classifier can be further extracted and input into the second preset classifier to determine the rotation state of the image. If the rotation state of the image determined by the second preset classifier is still that the image is rotated, then the final rotation state of the image is that the image is rotated, which can accurately determine the rotation state of the image.

In some embodiments of the disclosure, the display apparatus further can include a gyroscope. The gyroscope can be used to determine the screen mode, and the screen mode can be used to indicate the screen is in a landscape mode or a portrait mode.

In some embodiments of the disclosure, before the image can be displayed on the user interface, the image captured by the camera is adjusted so that the image can be displayed properly on the user interface, avoiding image rotation and affecting the user experience.

S201, determining the camera type according to the port information, the screen mode and the rotation state.

In some embodiments, the screen mode can include a landscape mode or a portrait mode; the rotation state can include rotation or non-rotation; and the camera type can include a direct plug-in type or a sit-stand type. In some embodiments, the direct plug-in camera may be an external camera. In other embodiments, the direct plug-in camera may be a camera built into the display apparatus.

In some embodiments, the step for determining the camera type according to the port information, the screen mode and the rotation state can include one or more of the following operations.

If the port information indicates the first port, the screen mode is the portrait mode, and the image is rotated, it can be determined that the camera type is a direct plug-in type.

If the port information indicates the second port, the screen mode is a landscape state, and the image is rotated, it can be determined that the camera type is a direct plug-in type.

If the port information indicates the first port, the screen mode is a landscape state, and the image is not rotated, it can be determined that the camera type is a preset type; where the preset type can include a direct plug-in type or a sit-stand type.

If the port information indicates the second port, the screen mode is a landscape state, and the image is not rotated, it can be determined that the camera type is a sit-stand type.

If the port information indicates the first port, the screen mode is the portrait mode, and the image is not rotated, it can be determined that the camera type is a sit-stand type.

If the port information indicates the second port, the screen mode is the portrait mode, and the image is not rotated, it can be determined that the camera type is a preset type.

S301, controlling the camera to capture an image according to the camera type, the port information and the screen mode, so that the captured image is properly displayed on the display. The normal or proper display on the display means that the image is not rotated with respect to the image captured originally by the camera.

In some embodiments, the step for controlling the camera to capture the image according to the camera type, the port information and the screen mode can include one or more of the following operations.

If the camera type is a sit-stand type and the screen is in a landscape mode, the camera can be controlled to capture an image according to the preset preview image ratio of min; and a rotation command for rotating the display is received, the screen mode is changed and the display is rotated to the portrait mode. When receiving the rotation command for rotating the display, the screen mode is changed to the portrait mode. In some embodiments, the user interface is provided with a rotation control. The user can move the focus to the rotation control through the control device and press the confirmation key on the control device, to generate the rotation command for rotating the display. When the screen of the display is in the portrait mode, whether the camera supports the preview image ratio of n:m is determined; if the camera supports the preview image ratio of n:m, the camera is controlled to capture an image according to the preview image ratio of n:m; and if the camera does not support the preview image ratio of n:m, the camera can be controlled to capture an image according to a preset preview image ratio, the captured image can be cropped according to the preview image ratio of n:m to maximize the retention of the captured image content, and the cropped image can be shown on the display. For example, the ratio of the display can be m:n, the size of the display can be 1920:1080, and the preset preview image ratio can be m:n, where m can be 16, and n can be 9. When the screen of the display is in the portrait mode and the preview image ratio of 9:16 is not supported, the image with the preset preview image ratio of 16:9 will be cropped according to the preview image ratio of 9:16, and the cropped image can be displayed on the display. It should be noted that: in some embodiments, when the cropped image is displayed, the cropped image can be rotated to be displayed in a full screen.

In some embodiments of the disclosure, the preview image ratio supported by the camera can be pre-stored. When the camera supports the preview image ratio of n:m, the ratio of the image captured by the camera can be n:m. However, due to different performances of different cameras, some cameras cannot support the preview image ratio of n:m. Therefore, when the screen is in the landscape mode, the display can be rotated to the portrait mode after the rotation command for rotating the display is received. Since the camera does not support the preview image ratio of n:m, the image captured by the camera needs to be processed and the processed image can be displayed on the display. In some embodiments of the disclosure, the image captured by the camera can be cropped according to the preview image ratio of n:m, and the cropped image can be displayed on the screen, so as to meet the requirement that the display displays an image with a ratio of n:m.

When the camera type is a sit-stand type and the screen is in a portrait mode, whether the camera supports the preview image ratio of n:m can be determined; if the camera supports the preview image ratio, the camera can be controlled to capture an image according to the preview image ratio of n:m; and if the camera does not support the preview image ratio, the camera can be controlled to capture an image according to the preset preview image ratio, the captured image can be cropped according to the preview image ratio of n:m, and the cropped image can be displayed on the display. The rotation command for rotating the display is received, the screen mode is changed, and the display is rotated to the landscape mode; the camera is controlled to capture an image according to the preset preview ratio of m:n; and the captured image can be displayed on the display.

When the camera type is a direct plug-in type, the port information can indicate the first port, and the screen is in a portrait mode, the image captured according to the preset preview image ratio of m:n can be rotated by the preset angle, and the rotated image can be displayed on the display. For example, the preset angle can be 90°. After the image is rotated by the preset angle, the image can be displayed properly on the display without rotation. The rotation command for rotating the display is received, the screen mode is changed and the display is rotated to the landscape mode; the camera can be controlled to capture an image according to the preset preview image ratio of m:n; and the captured image can be displayed on the display properly.

When the camera type is a direct plug-in type, the port information indicates the first port, and the screen is in a landscape mode, the camera can be controlled to capture an image according to the preset preview image ratio of m:n; upon receiving a rotation command for rotating the display, the screen mode is changed and the display is rotated to the portrait mode; and an image captured by the camera according to the preset preview image ratio of m:n can be rotated by the preset angle, and the rotated image can be displayed on the display.

When the camera type is a direct plug-in type, and the port information indicates the second port, whether the camera supports the preview image ratio of n:m can be determined; if the camera supports the preview image ratio, whether the screen is in a portrait mode will be determined. If the screen is in the portrait mode, the camera can be controlled to capture an image according to the preview image ratio of n:m; the rotation command for rotating the display is received, the screen mode is changed and the display is rotated to the landscape mode; and an image captured by the camera according to the preview image ratio of n:m can be rotated by the preset angle, and the rotated image can be displayed on the display. If the screen is in the landscape mode, an image captured by the camera according to the preview image ratio of n:m can be rotated by the preset angle, and the rotated image can be displayed on the display; the rotation command for rotating the display is received, the screen mode is changed and the display is rotated to the portrait mode; and the camera can be controlled to capture an image according to the preview image ratio of n:m, and the captured image can be displayed on the display.

If the camera does not support the preview image ratio, whether the screen is in a portrait mode will be determined. If the screen is in a portrait mode, an image can be captured by the camera according to the preset preview image ratio, the captured image can be cropped according to the preview image ratio of n:m, and the cropped image can be displayed on the display; the rotation command for rotating the display is received, the screen mode is changed and the display is rotated to the landscape mode; and the camera can be controlled to capture an image according to the preset preview image ratio of m:n, the captured image can be rotated by the preset angle, and the rotated image can be displayed on the display. If the screen is in a landscape mode, the image captured by the camera according to the preset preview image ratio of m:n can be cropped, where the ratio of the cropped image can be n:m; the cropped image can be rotated by the preset angle, and the rotated image can be displayed on the display; the rotation command for rotating the display is received, the screen mode can be changed and the display can be rotated to the portrait mode; and the image can be rotated in reverse by a preset angle, and the rotated image can be displayed on the display. In some embodiments, the rotated image can be displayed on the display in a full screen.

In the above embodiments, a method and a display apparatus for determining the preview direction of a camera are provided. The embodiments of the disclosure adjust the image captured by the camera according to the camera type, the port information and the screen mode, so that the image can be displayed properly on the display and the user experience can be improved. The method can include: receiving a command for starting a preset application, and obtaining the port information, the screen mode and the rotation state, where the port information can be used to indicate the port plugged by the camera, the screen mode can be used to indicate the screen is in a landscape mode or a portrait mode, and the rotation state can be used to indicate whether the image is rotated; determining the camera type based on the port information, the screen mode, and the rotation state; and controlling the camera to capture an image based on the camera type, the port information, and the screen mode.

For the convenience of explanation, the above description has been made in combination with specific embodiments. However, the above discussion in some embodiments is not intended to be exhaustive or to limit embodiments to the specific forms disclosed above. Numerous modifications and variations are possible in light of the above teachings. The above embodiments have been chosen and described to better explain the principles and practical applications, so as to enable those skilled in the art to better utilize the embodiments and various modified embodiments suitable for specific considerations.

What is claimed is:

1. A display apparatus, comprising:
   a display, configured to display an image or a user interface;
   a user input interface, configured to receive input signals; and
   one or more processors, in connection with the display and the user input interface respectively, wherein the one or more processors is configured to execute instructions to cause the display apparatus to perform:
   receiving a command for starting a preset application in the display apparatus, and obtaining a plugged sequence of ports plugged by cameras on the display apparatus and a screen mode of the display, wherein the screen mode is configured to indicate that the display is in a landscape mode or a portrait mode;

starting a camera corresponding to a port in a preset order in the plugged sequence of ports; and based on the screen mode, controlling the camera to capture a first image according to a preview image ratio, rotating the first image by a preset angle, and displaying rotated first image on the display.

2. The display apparatus according to claim 1, wherein the one or more processors is further configured to execute instructions to cause the display apparatus to perform:

receiving a rotation command for rotating the display, changing the screen mode, rotating the display based on the rotation command, rotating a second image captured by the camera according to the preview image ratio by a preset angle, and displaying rotated second image on the display.

3. The display apparatus according to claim 1, wherein the one or more processors is further configured to execute instructions to cause the display apparatus to perform determining the plugged sequence of ports plugged by cameras on the display apparatus by:

starting a preset service in the display apparatus;

determining whether one or more camera are plugged into the display apparatus according to the preset service, and monitoring port plugged information; wherein the port plugged information comprises information of a port being plugged by a camera and information of the camera being unplugged from the port; and based on that monitoring a first port being plugged by a first camera, or the first camera being unplugged from the first port, updating the plugged sequence of the ports plugged by the cameras on the display apparatus.

4. The display apparatus according to claim 3, wherein the one or more processors is further configured to execute instructions to cause the display apparatus to perform:

based on that no camera is plugged into the display apparatus, controlling the display to display prompt information for plugging a camera.

5. The display apparatus according to claim 2, wherein the one or more processors is further configured to execute instructions to cause the display apparatus to perform:

based on that the port in the preset order in the plugged sequence is a first port and the screen mode is the landscape mode, controlling the camera to capture a third image according to a first preview image ratio of m:n;

receiving a rotation command for rotating the display, changing the screen mode from landscape mode to a portrait mode, and rotating the display to the portrait mode;

rotating a fourth image captured by the camera according to the first preview image ratio of m:n by a preset angle; and displaying rotated fourth image on the display.

6. The display apparatus according to claim 2, wherein the one or more processors is further configured to execute instructions to cause the display apparatus to perform:

based on that the port in the preset order in the plugged sequence is the first port and the screen mode is the portrait mode, rotating a fifth image captured by the camera according to the first preview image ratio of min by a preset angle, and displaying rotated fifth image on the display; and receiving a rotation command for rotating the display, changing the screen mode from the portrait mode to the landscape mode, rotating the display to the landscape mode according to the rotation command, and displaying an image captured by the camera according to the first preview image ratio of min on the display.

7. The display apparatus according to claim 2, wherein the one or more processors is further configured to execute instructions to cause the display apparatus to perform:

based on that the port in the preset order in the plugged sequence is a second port and the screen mode is the landscape mode, rotating a sixth image captured by the camera according to a second preview image ratio of n:m by a preset angle, and displaying rotated sixth image on the display; and receiving a rotation command for rotating the display, changing the screen mode from the landscape mode to the portrait mode, rotating the display to the portrait mode according to the rotation command, and displaying a seventh image captured by the camera according to the second preview image ratio of n:m on the display.

8. The display apparatus according to claim 2, wherein the one or more processors is further configured to execute instructions to cause the display apparatus to perform:

based on that the port in the preset order in the plugged sequence is a second port and the screen mode is the portrait mode, controlling the camera to capture a eighth image according to a second preview image ratio of n:m;

receiving a rotation command for rotating the display, changing the screen mode from the portrait mode to the landscape mode, and rotating the display to the landscape mode according to the rotation command;

rotating a ninth image captured by the camera according to the second preview image ratio of n:m by a preset angle; and displaying rotated ninth image on the display.

9. An image processing method for a display apparatus, comprising:

receiving a command for starting a preset application in the display apparatus, and obtaining a plugged sequence of ports plugged by cameras on the display apparatus and a screen mode of the display, wherein the screen mode is configured to indicate that the display is in a landscape mode or a portrait mode;

starting a camera corresponding to a port in a preset order in the plugged sequence of ports; and based on the screen mode, controlling the camera to capture a first image according to a preview image ratio, rotating the first image by a preset angle, and displaying rotated first image on the display.

10. The method according to claim 9, wherein the method further comprises:

receiving a rotation command for rotating the display, changing the screen mode, rotating the display based on the rotation command, rotating a second image captured by the camera according to the preview image ratio by a preset angle, and displaying rotated second image on the display.

11. The method according to claim 9, wherein the method further comprises:

starting a preset service in the display apparatus;

determining whether one or more camera are plugged into the display apparatus according to the preset service; and monitoring port plugged information, wherein the port plugged information comprises information of a port being plugged by a camera and information of the camera being unplugged from the port; and based on that monitoring a first port being plugged by a first camera, or the first camera being unplugged from the first port, updating the plugged sequence of the ports plugged by the cameras on the display apparatus.

12. The method according to claim 11, further comprising:

based on that no camera is plugged into the display apparatus, controlling the display to display prompt information for plugging a camera.

13. The method according to claim 10, further comprising:

based on that the port in the preset order in the plugged sequence is a first port and the screen mode is the landscape mode, controlling the camera to capture a third image according to a first preview image ratio of m:n;

receiving a rotation command for rotating the display, changing the screen mode from landscape mode to a portrait mode, and rotating the display to the portrait mode;

rotating a fourth image captured by the camera according to the first preview image ratio of m:n by a preset angle; and displaying rotated fourth image on the display.

14. The method according to claim 10, further comprising:

based on that the port in the preset order in the plugged sequence is the first port and the screen mode is the portrait mode, rotating a fifth image captured by the camera according to the first preview image ratio of m:n by a preset angle, and displaying rotated fifth image on the display; and receiving a rotation command for rotating the display, changing the screen mode from the portrait mode to the landscape mode, rotating the display to the landscape mode according to the rotation command, and displaying an image captured by the camera according to the first preview image ratio of m:n on the display.

15. The method according to claim 10, further comprising:

based on that the port in the preset order in the plugged sequence is a second port and the screen mode is the landscape mode, rotating a sixth image captured by the camera according to a second preview image ratio of n:m by a preset angle, and displaying rotated sixth image on the display; and receiving a rotation command for rotating the display, changing the screen mode from the landscape mode to the portrait mode, rotating the display to the portrait mode according to the rotation command, and displaying a seventh image captured by the camera according to the second preview image ratio of n:m on the display.

16. The method according to claim 10, further comprising:

based on that the port in the preset order in the plugged sequence is a second port and the screen mode is the portrait mode, controlling the camera to capture a eighth image according to a second preview image ratio of n:m;

receiving a rotation command for rotating the display, changing the screen mode from the portrait mode to the landscape mode, and rotating the display to the landscape mode according to the rotation command;

rotating a ninth image captured by the camera according to the second preview image ratio of n:m by a preset angle; and displaying rotated ninth image on the display.

\* \* \* \* \*